United States Patent
Zhang et al.

(10) Patent No.: US 8,650,159 B1
(45) Date of Patent: Feb. 11, 2014

(54) SYSTEMS AND METHODS FOR MANAGING DATA IN CLOUD STORAGE USING DEDUPLICATION TECHNIQUES

(75) Inventors: Xianbo Zhang, Madison, WI (US); Weibao Wu, Vadnais Heights, MN (US)

(73) Assignee: Symantec Corporation, Mountain View, CA (US)

( * ) Notice: Subject to any disclaimer, the term of this patent is extended or adjusted under 35 U.S.C. 154(b) by 230 days.

(21) Appl. No.: 12/868,869

(22) Filed: Aug. 26, 2010

(51) Int. Cl.
*G06F 17/00* (2006.01)

(52) U.S. Cl.
USPC ............ 707/664; 707/696; 711/161; 711/162

(58) Field of Classification Search
USPC .......... 707/664, 696, 674, E17.007, E17.005; 711/162, 163, 114, 161
See application file for complete search history.

(56) References Cited

U.S. PATENT DOCUMENTS

| | | | |
|---|---|---|---|
| 7,685,459 B1 * | 3/2010 | De Spiegeleer et al. ..... | 714/6.12 |
| 8,004,992 B2 * | 8/2011 | Abraham et al. ............ | 370/236 |
| 8,041,907 B1 * | 10/2011 | Wu et al. ........................ | 711/161 |
| 8,204,868 B1 * | 6/2012 | Wu et al. ........................ | 707/693 |
| 8,225,219 B2 * | 7/2012 | Edelen et al. .................. | 715/753 |
| 8,280,926 B2 * | 10/2012 | Sandorfi et al. ............... | 707/812 |
| 8,285,681 B2 * | 10/2012 | Prahlad et al. ................. | 707/640 |
| 8,352,540 B2 * | 1/2013 | Anglin et al. .................. | 709/201 |
| 8,396,841 B1 * | 3/2013 | Janakiraman ................. | 707/692 |
| 2008/0243878 A1 * | 10/2008 | de Spiegeleer et al. ....... | 707/100 |
| 2008/0243953 A1 * | 10/2008 | Wu et al. ........................ | 707/204 |
| 2008/0313527 A1 * | 12/2008 | Chen ............................. | 715/200 |
| 2009/0116349 A1 * | 5/2009 | Takashima .................... | 369/47.1 |
| 2009/0204903 A1 * | 8/2009 | Edelen et al. .................. | 715/752 |
| 2010/0070476 A1 * | 3/2010 | O'Keefe et al. ............... | 711/162 |
| 2010/0106691 A1 * | 4/2010 | Preslan et al. ................. | 707/674 |
| 2010/0257142 A1 * | 10/2010 | Murphy et al. ................ | 711/162 |
| 2010/0332401 A1 * | 12/2010 | Prahlad et al. .................. | 705/80 |
| 2010/0332454 A1 * | 12/2010 | Prahlad et al. ................ | 707/654 |
| 2010/0332456 A1 * | 12/2010 | Prahlad et al. ................ | 707/664 |
| 2011/0161291 A1 * | 6/2011 | Taleck et al. .................. | 707/622 |
| 2011/0161297 A1 * | 6/2011 | Parab ............................ | 707/646 |
| 2011/0167096 A1 * | 7/2011 | Guo et al. ..................... | 707/816 |

OTHER PUBLICATIONS

Qinlu He, Zhanhuai Li, Xiao Zhang—"Analysis of the key technology on cloud storage"—2010 International Conference on Future Information Technology and Management Engineering (FITME 2010, IEEE—2010, (pp. 426-429).*

(Continued)

*Primary Examiner* — Jean B Fleurantin
*Assistant Examiner* — Anh Ly
(74) *Attorney, Agent, or Firm* — Holland & Hart LLP

(57) ABSTRACT

A computer-implemented method for managing data in cloud storage using deduplication techniques is described. At least one unique segment of data is received from at least one backup source. The at least one unique segment of data is written to at least one container file associated with the at least one back up source. An index file is created for the at least one container file. The index file includes information regarding the unique segments of data. A plurality of the unique segments of data is transmitted from the at least one container file as an object to a virtual container on cloud storage. A virtual container is composed of an index file and one or more container files, and the index file and each container file are stored as individual cloud storage objects. Spatial locality of the plurality of unique segments of data is maintained in cloud storage.

20 Claims, 12 Drawing Sheets

(56) References Cited

OTHER PUBLICATIONS

Julei Sui, Jiancong Tong, Gang Wang and Xiaoguang Liu—"A Correlation-Aware Prefetching Strategy for Object-Based File System"—Algorithms and Architectures for Parallel Processing, Lecture Notes in Computer Science, 2010, vol. 6081/2010, (pp. 236-245).*

Harnik, D.; IBM Haifa Res. Lab., Haifa, Israel; Pinkas, B.; Shulman-Peleg, A.—"Side Channels in Cloud Services: Deduplication in Cloud Storage"—Browse Journals & Magazines > Security & Privacy, IEEE . . . Nov.-Dec. 2010—vol. 8 Issue: 6—(pp. 40-47).*

Qinlu He ; Dept. of Comput. Sci., Northwestern Polytech. Univ., Xi''an, China; Zhanhuai Li; Xiao Zhang—"Data deduplication techniques"—Future Information Technology and Management Engineering (FITME), 2010 International Conference on (vol. 1) 2010 IEEE—(pp. 430-433).*

* cited by examiner

SYSTEMS AND METHODS FOR MANAGING DATA IN CLOUD STORAGE USING DEDUPLICATION TECHNIQUES

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Data stored on a computing device may become corrupted and inaccessible. A backup of the data may be performed in order to restore the data in the event the data becomes corrupted and inaccessible. A backup refers to making copies of the data. These copies of data may be used to restore the original data after a data loss event. Backups may be useful for many purposes. For example, backups may restore data following a disaster. This may be referred to as disaster recovery. In addition, backups may restore a small number of files that have been accidentally deleted or corrupted.

Because a system that backs up data includes at least one copy of all data worth saving, the data storage requirements may be considerable. Organizing the data storage space and managing the backup process may be a complicated and time consuming undertaking. As a result, benefits may be realized by providing system and methods for managing data in cloud storage using deduplication techniques.

SUMMARY

According to at least one embodiment, a computer-implemented method for managing data in cloud storage using deduplication techniques is described. At least one unique segment of data is received from at least one backup source. The at least one unique segment of data is written to at least one container file associated with the at least one back up source. An index file is created for the at least one container file. The index file includes information regarding the unique segments of data. A plurality of the unique segments of data is transmitted from the at least one container file as an object to a virtual container on cloud storage. Spatial locality of the plurality of unique segments of data is maintained in cloud storage.

In one example, the index file is transmitted as an object to the virtual container on cloud storage. The index file object combined with the at least one container file comprises the virtual container. The spatial locality of the at least one segments of data may be maintained in the at least one container file.

In one embodiment, a virtual container storing at least one requested segment of data on cloud storage may be identified. A first object may be retrieved from the identified virtual container that includes the at least one requested segment of data. The contents of the first object may be written to local memory. At least one additional object may be retrieved from the identified virtual container on cloud storage, wherein the at least one additional object is spatially located near the first object.

In one configuration, a first index file associated with the identified virtual container on cloud storage may be retrieved. The first index file may be written to local memory. The first index file in local memory may be modified by marking at least one metadata records in the first index file that is associated with the at least one requested segment of data on cloud storage. A removal command may be transmitted to an object in cloud storage that comprises the at least one requested segment of data once all segments contained in a cloud storage object are marked as deleted. The modified first index file may be uploaded to cloud storage to replace the first index file.

A computing device configured to manage data in cloud storage using deduplication techniques is also described. The computing device may include a processor and memory in electronic communication with the processor. The device may further include a deduplication module configured to receive at least one unique segment of data from at least one backup source, and write the at least one unique segment of data to at least one container file associated with the at least one back up source. The deduplication module may be further configured to create an index file for the at least one container file. The index file may include information regarding the unique segments of data. The deduplication module may also be configured to transmit a plurality of the unique segments of data from the at least one container file as an object to a virtual container on cloud storage. Spatial locality of the plurality of unique segments of data may be maintained in cloud storage.

A computer-program product for managing data in cloud storage using deduplication techniques is also described. The computer-program product may include a computer-readable medium having instructions thereon. The instructions may include code programmed to receive at least one unique segment of data from at least one backup source, and code programmed to write the at least one unique segment of data to at least one container file associated with the at least one back up source. The instructions may further include code programmed to create an index file for the at least one container file. The index file may include information regarding the unique segments of data. The instructions may also include code programmed to transmit a plurality of the unique segments of data from the at least one container file as an object to a virtual container on cloud storage. Spatial locality of the plurality of unique segments of data may be maintained in cloud storage.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
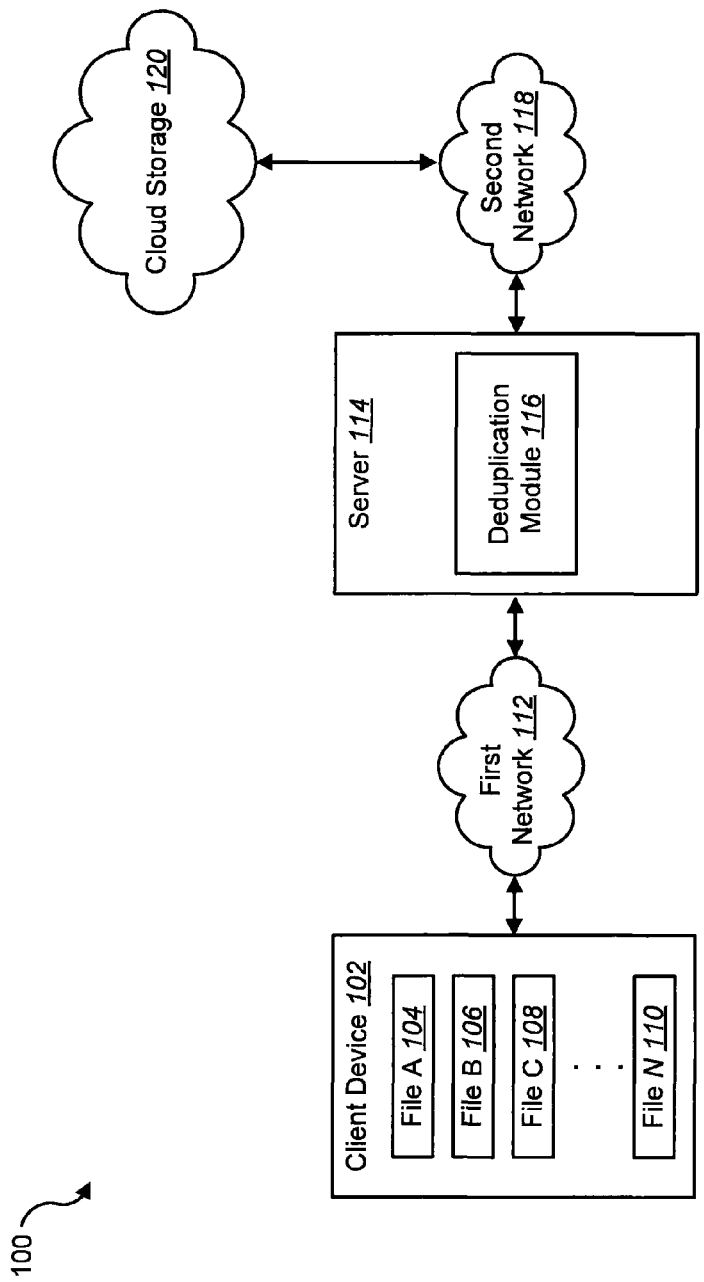
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing systems, data deduplication may refer to a specialized data compression technique for eliminating redundant data. Data deduplication may improve storage utilization of data. In the deduplication process, duplicate data are deleted, leaving a single copy of the data to be stored, along with references to the unique copy of the data. Deduplication may reduce required storage capacity since only the unique data are stored. Typically, the unique data are stored in a data storage associated with the computing device that performs the deduplication process. For example, a deduplication server (i.e., a server that performs data deduplication), may store the unique data in a database or other data storage mechanism connected to or associated with the deduplication server.

The present systems and methods may enable a deduplication backup system to store the unique data in cloud storage. Cloud storage may be a model of networked online storage where data are stored on multiple virtual servers, generally hosted by third parties, rather than being hosted on dedicated servers. Cloud storage services may be accessed through a web service application programming interface (API), or through a web-based user interface.

In one embodiment, the present systems and methods may allow a deduplication server, which runs outside of cloud storage, to efficiently write unique data segments into, and read the data segments from, cloud storage. The present systems and methods may extend a typical deduplication backup system to use cloud storage as its data storage by leveraging segment caching and cloud storage web service interfaces such as, but not limited to, GET, PUT, and DELETE.

Segments of data stored within cloud storage may be grouped into virtual containers. In one embodiment, a virtual container is a logic group of unique data segments that originate from the same data backup source and may be ordered in the virtual container by their creation time. A virtual container may be composed of an index file and one or more container files, and the index file and each container file may be stored as individual cloud storage objects. Virtual containers may facilitate data locality and prefetching. As a result, data transmissions between a deduplication server and cloud storage may be minimized. In addition, virtual containers may cause cloud storage to be transparent to a deduplication server running outside of the cloud storage.

Using cloud storage as an offsite, disaster recovery storage may attract users seeking for a cost effective data protection solution. Advantages may exist by running a deduplication server at a customer site (i.e., outside of cloud storage) while using cloud storage as the data storage mechanism. In a traditional backup system, a deduplication server may only transfer unique data between the deduplication server and clients (i.e., data backup source). Further, in a traditional backup system, the deduplication server may only store unique data on the data storage mechanism (such as a local disk storage mechanism).

Deduplication techniques combined with cloud storage may reduce total costs of ownership since cloud storage providers typically charge users based on the amount of stored data, and the amount of data transferred in and out of cloud storage. A traditional deduplication server, however, may be optimized to interface with files stored on local disk storage through file system interfacing while access to data stored on cloud storage may require web service interfacing such as, but not limited to, PUT, GET, and DELETE. This difference in data access, and generally very low bandwidth, to cloud storage may require a redesign of current deduplication engines in order to use cloud storage efficiently as backend storage. For example, during backup many data segments are typically stored into one file to keep the data locality and improve backup and restore performance. This current method, however, may cause problems when the deduplication server attempts to interact or implement file operations on cloud storage. In other words, adding, deleting, or modifying any data segment in the file that is stored in cloud storage may require the entire file to be transferred from cloud storage and cached to a local disk or memory through the web service interface GET. The cached file may then be modified using file system interface calls. The updated file may then be uploaded back to cloud storage through the web service interface PUT.

The scenario described above is contradictory to the principle of deduplication technology. Untouched (or unmodified) segments of data in the file are duplicate data and should not be transmitted back and forth between cloud storage and the local disk or memory in accordance with the principle of deduplication technology.

FIG. 1 is a block diagram illustrating one embodiment of an environment 100 in which the present systems and methods may be implemented. In one embodiment, a client device 102 may communicate with a server 114 across a first network connection 112. In one configuration, the first network 112 may be a local area network (LAN). The client device 102 may be a personal computer (PC), a laptop computer, a mobile device, a smart phone, a personal digital assistant (PDA), and the like. In one example, the client device 102 may include one or more files. For example, the client device 102 may include file A 104, file B 106, file C 108, up to file N 110.

The server 114 may include a deduplication module 116. The deduplication module 116 may implement the deduplication technique to optimize the storage of data within the various files 104, 106, 108, 110 on the client device 102. In one embodiment, the server 114 may communicate with cloud storage 120 across a second network connection 118. The second network connection 118 may be a wide area network (WAN). The data compressed by the deduplication module 116 may be stored within cloud storage 120. The server 114 may also retrieve the data stored within cloud storage 120 in order to restore a file in its original form to the client device 102. The deduplication module 116 may compress the data and serve as a module to backup the data contained in the various files 104, 106, 108, 110 stored on the client device 102.

Figure 2:
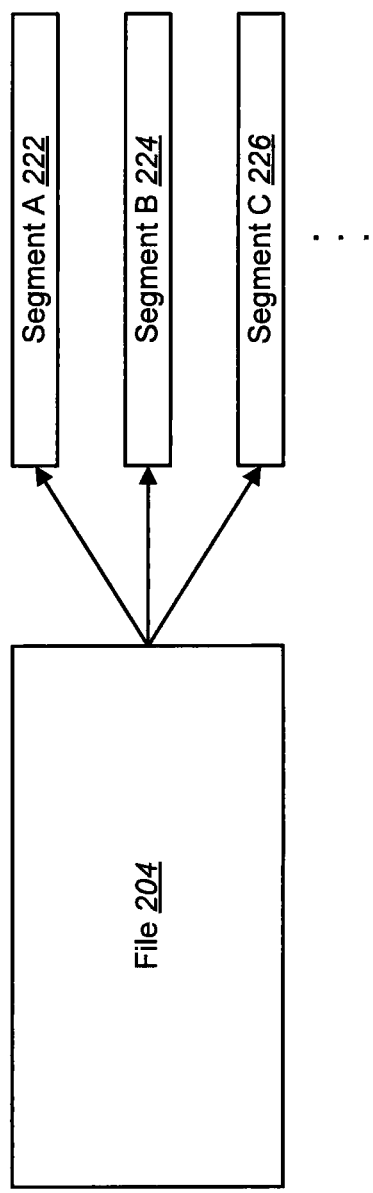
FIG. 2 is a block diagram illustrating one embodiment of a file that may be stored on the client device.

FIG. 2 is a block diagram illustrating one embodiment of a file 204 that may be stored on the client device 102. In one configuration, the file 104 may be made up of various segments of data. For example, the file 204 may be made up of segment A 222, segment B 224, and segment C 226. Although only three data segments are illustrated in FIG. 2, it is to be understood that the file 204 may be made up of more or less than three segments of data. In addition, the various segments of data that make up a file may be redundant, unique, etc. In other words, file 204 may be made up of various segments of data that are each unique to each other. In another embodiment, the file 204 may be made up of unique segments of data as well as segments of data that are identical to other segments of data making up the file 204.

Figure 3:
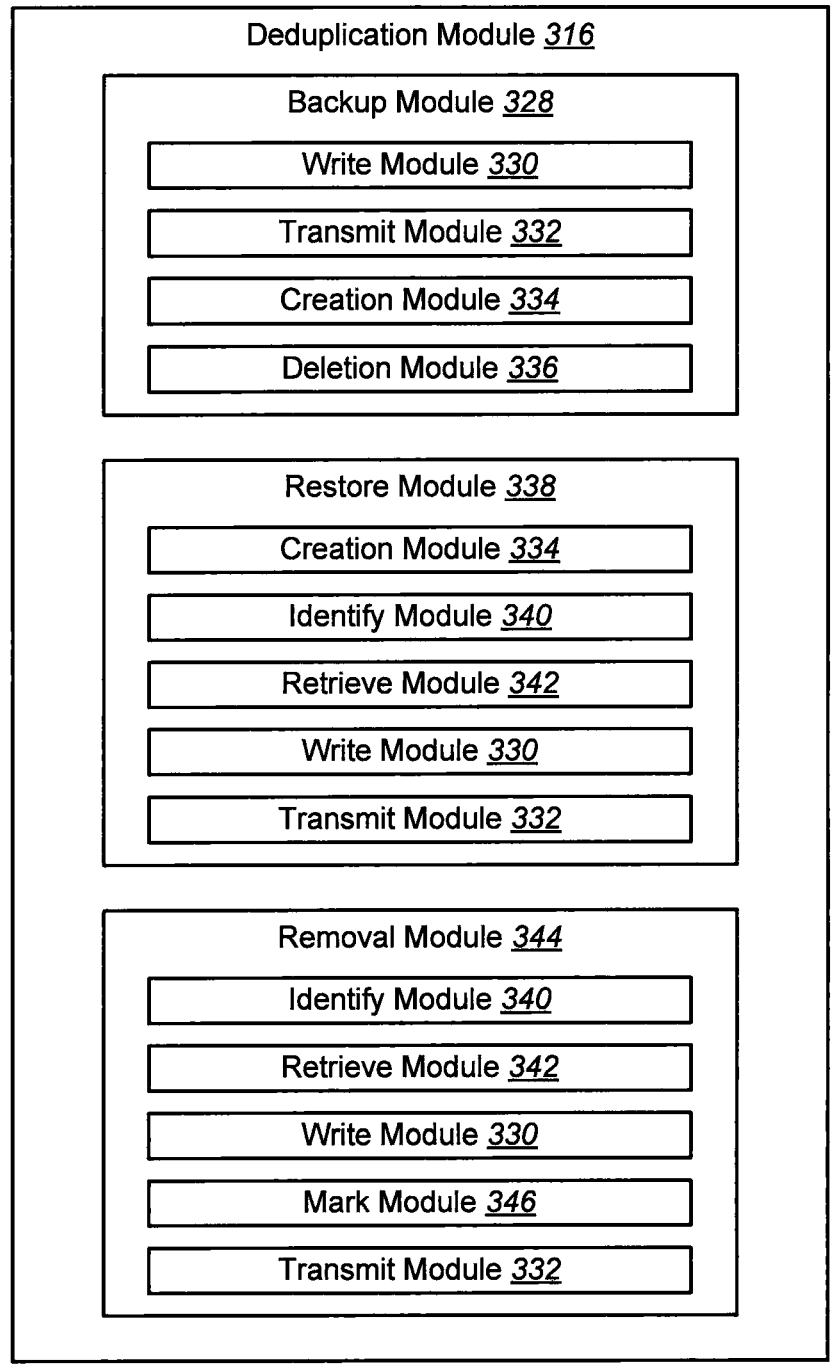
FIG. 3 is a block diagram illustrating one embodiment of a deduplication module that may implement the present systems and methods.

FIG. 3 is a block diagram illustrating one embodiment of a deduplication module 316 that may implement the present systems and methods. As previously described, the deduplication module 316 may be located on and run on the server 114. The deduplication module 316 may include a backup module 328, a restore module 338, and a removal module 344. The backup module 328 may be used to store segments of data received from the client device 102. The segments of data stored by the backup module 328 may serve as a backup to the original data stored on the client device 102.

In one embodiment the backup module 328 may include a write module 330. The write module 330 may write unique segments of data received from the client 102 to a local disk or memory of the server 114. The local disk or memory may be internal or external to the server 114. The backup module 328 may also include a transmit module 332. The transmit module 332 may transmit the stored segments of data to cloud storage 120. The backup module 328 may further include a creation module 334. The creation module 336 may create an index file that may include information regarding each of the segments of data transmitted to cloud storage 120. For example, the index file may include information regarding the size of each segment of data, the location of each segment of data on cloud storage 120, an offset (if any) for each segment of data, and the like. A deletion module 336 may remove or delete the index file from the local disk or memory. The transmit module 332 may transmit the created index file to cloud storage 120. In another embodiment, a copy of the index file may remain on the local disk or memory for future use.

In one embodiment, the restore module 338 may retrieve segments of data from cloud storage 120 and provide them to the client device 102 in order to recreate or restore the original data on the client device 102. In one example, the restore module 338 may include the creation module 334. The creation module 334 may create a central index file that includes identifiers for all of the unique segments of data stored on cloud storage 120. An identify module 340 may identify the segments of data stored on cloud storage 120 (based on the identifiers). The identify module 340 may identify the segments of data requested by the client device 102. A retrieve module 342 may retrieve the identified segments of data from cloud storage 120. The write module 330 may write the retrieved segments of data to the local disk or memory of the server 114. The transmit module 332 may then transmit the retrieved segments of data from the local disk or memory to the client device 102 that requested the segments of data.

The removal module 344 may locate a segment of data or multiple segments of data stored on cloud storage 120 and remove the located segments of data from cloud storage 120. In one embodiment, the removal module 344 may include the identify module 340. The identify module 340 may identify the one or more segments of data to remove from cloud storage 120. The retrieve module 342 may retrieve the index file (currently stored on cloud storage 120) associated with the one or more segments of data that are to be removed from cloud storage 120. The write module 330 may write the retrieved index file to the local disk or memory of server 114, if a copy of the index file does not already exist on the local disk or memory. A mark module 346 may modify information in the index file associated with the one or more segments of data that are to be removed from cloud storage 120. For example, the mark module 346 may mark the one or more records of the index file that are associated with the one or more segments of data to be removed. The segments of data may then be removed from cloud storage 120. In one embodiment, a web service interface command DELETE may be transmitted by the transmit module 332 to cloud storage 120. This command may remove the identified segments of data from cloud storage 120 if each segment is stored as one cloud storage object. If multiple segments are stored as one cloud storage object, the object may only be removed if all segments contained in the objects are marked as deleted. The transmit module 332 may also transmit or upload the modified index file to cloud storage 120 following the deletion of the segments of data. In one embodiment, a copy of the modified index file may remain on the local disk or memory.

Figure 4:
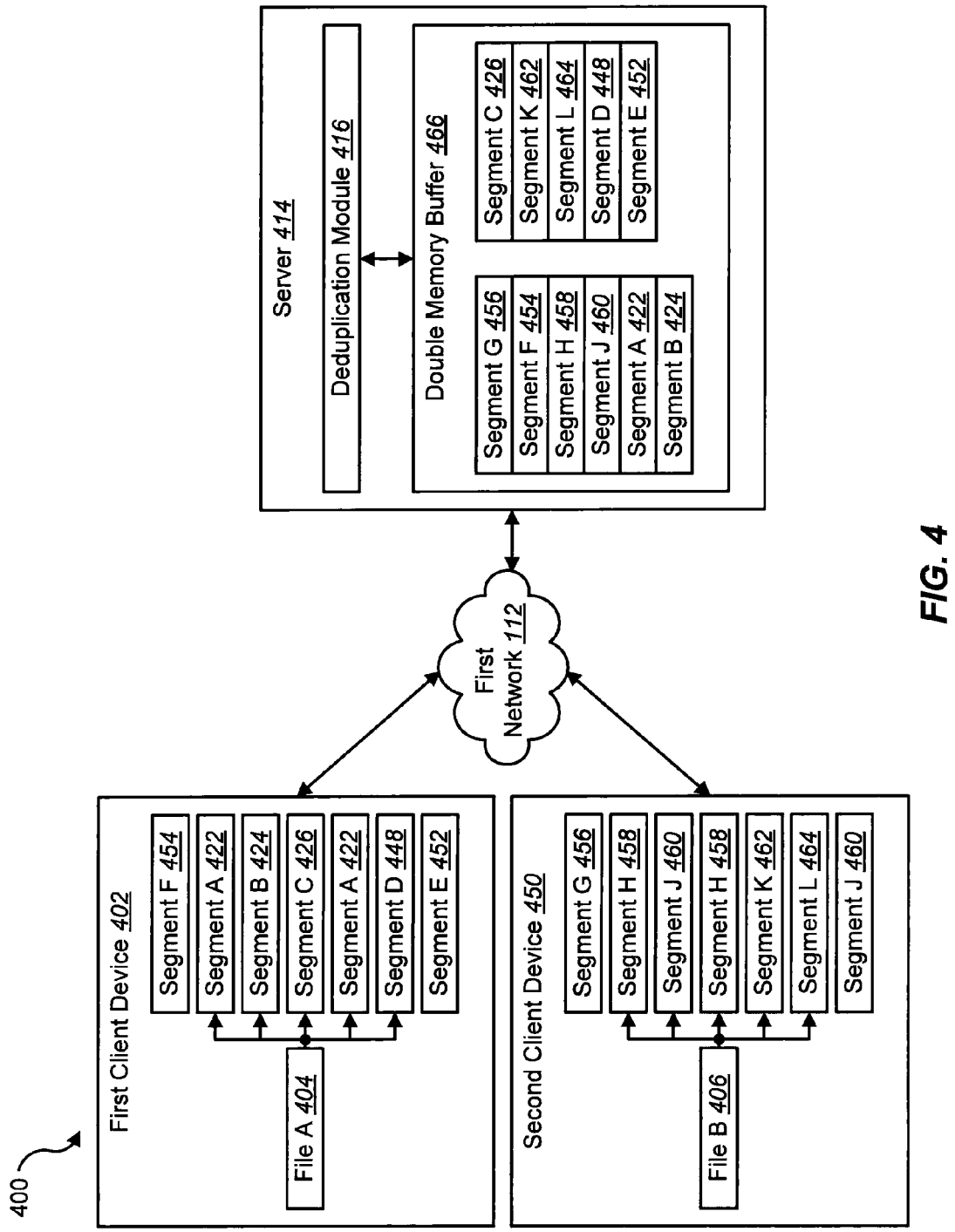
FIG. 4 is a block diagram illustrating one example of backing up data using deduplication techniques.

FIG. 4 is a block diagram illustrating one example of backing up data using deduplication techniques. In one embodiment, a first client device 402 and a second client device 450 may store one or more files. For example, the first client device 402 may store file A 404, and the second client device 450 may store file B 406. Each file 404, 406 may be broken up into a plurality of segments of data. For example, the file A 404 may be broken up into segment F 454, segment A 422, segment B 424, segment C 426, segment A 422, segment D 448 and segment E 452. As illustrated, file A 404 may be made up of or broken into multiple unique segments of data and identical segments of data. For example, file A 404 includes two identical copies of segment A 422. File B 406 may also be broken up into various segments of data. As illustrated in FIG. 4, file B 406 may include two identical copies of segment H 458 and two identical copies of segment J 460. As a result, file A 404 and file B 406 may share common segments that may be saved once as a single segment.

The multiple segments of data from the first client device 402 and the second client device 450 may be transmitted across a first network connection 112 to a server 414. A deduplication module 416 may analyze the various incoming segments and store the unique segments of data in memory, such as a double memory buffer 466. Through double memory buffer 466, where each buffer may hold more than one segment, receiving data from clients over network and writing data from buffer to storage may be overlapped to increase the backup performance. In another embodiment, only unique data segments may be sent over to the deduplication module 416 after the clients query the existence of segments. As illustrated, the deduplication module 416 only stores a single copy of each unique segment of data in the double memory buffer 466. As a result, the double memory buffer 466 does not store duplicate segments of data. In other words, the deduplication module 416 may only store a single copy of segment A 422, segment H 458, and segment J 460.

Figure 5:
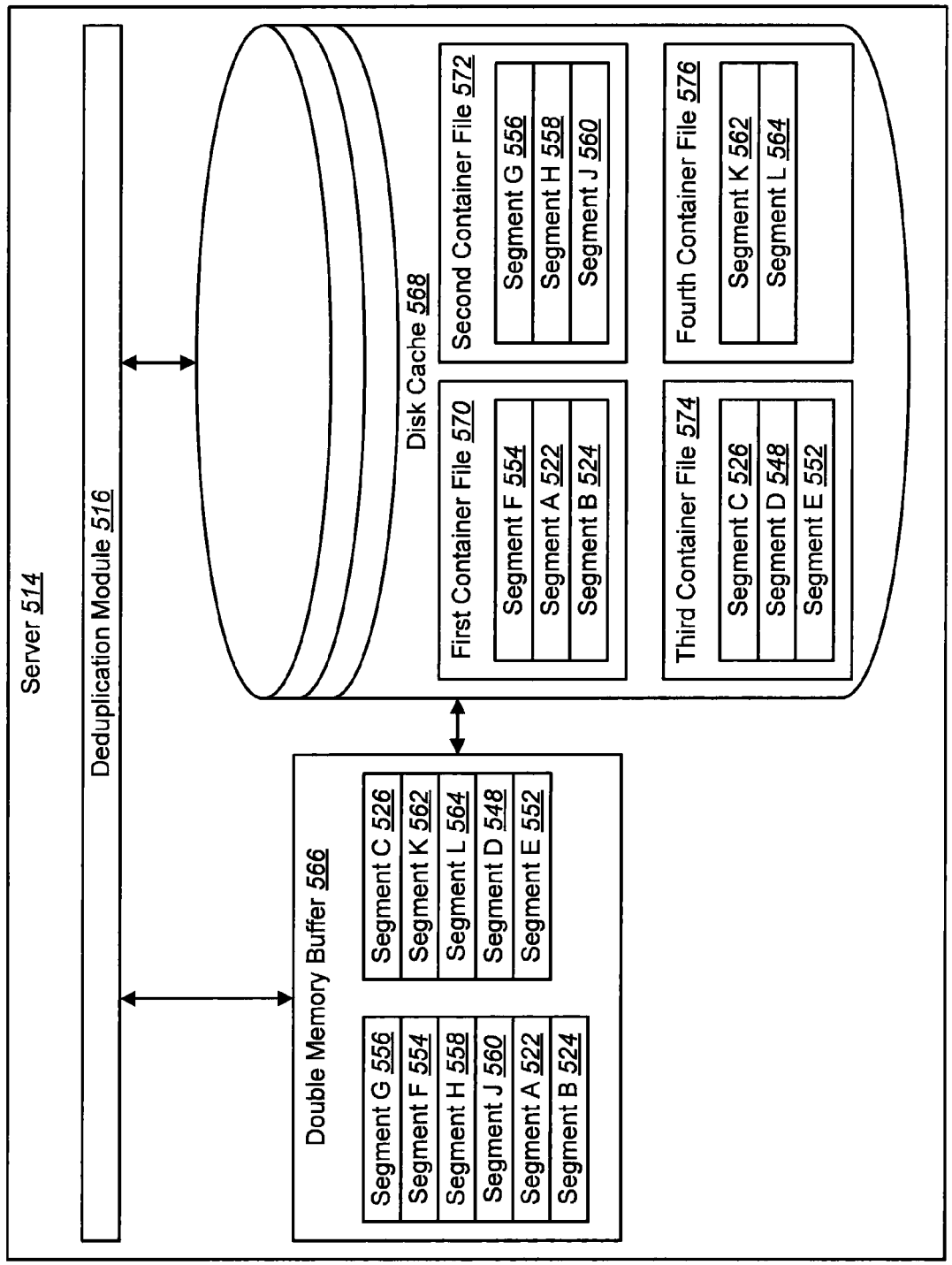
FIG. 5 is a block diagram illustrating one embodiment of a server that may implement the present systems and methods.

FIG. 5 is a block diagram illustrating one embodiment of a server 514. The server 514 may include the deduplication module 516. As previously explained, the deduplication module 516 may store unique segments of data in memory such as a double memory buffer 566. The deduplication module 516 may also create one or more container files 570, 572, 574, 576 to hold or store one or more segments of data stored in the double memory buffer 566. The various container files 570, 572, 574, 576 may be stored on a local disk cache 568. As illustrated, the first container file 570 may store segment F 554, segment A 522, and segment B 524. Each of the segments stored within the first container file 570 may originate from the same source, such as the first client device 402. The third container file 574 may store segment C 526, segment D 548 and segment E 552. The third container file 574 may store segments of data that also originate from the same source, such as the first client device 402. The second container file 572 and the fourth container file 576 may each store segments of data that originated from the same backup source, such as the second client device 450.

Figure 6:
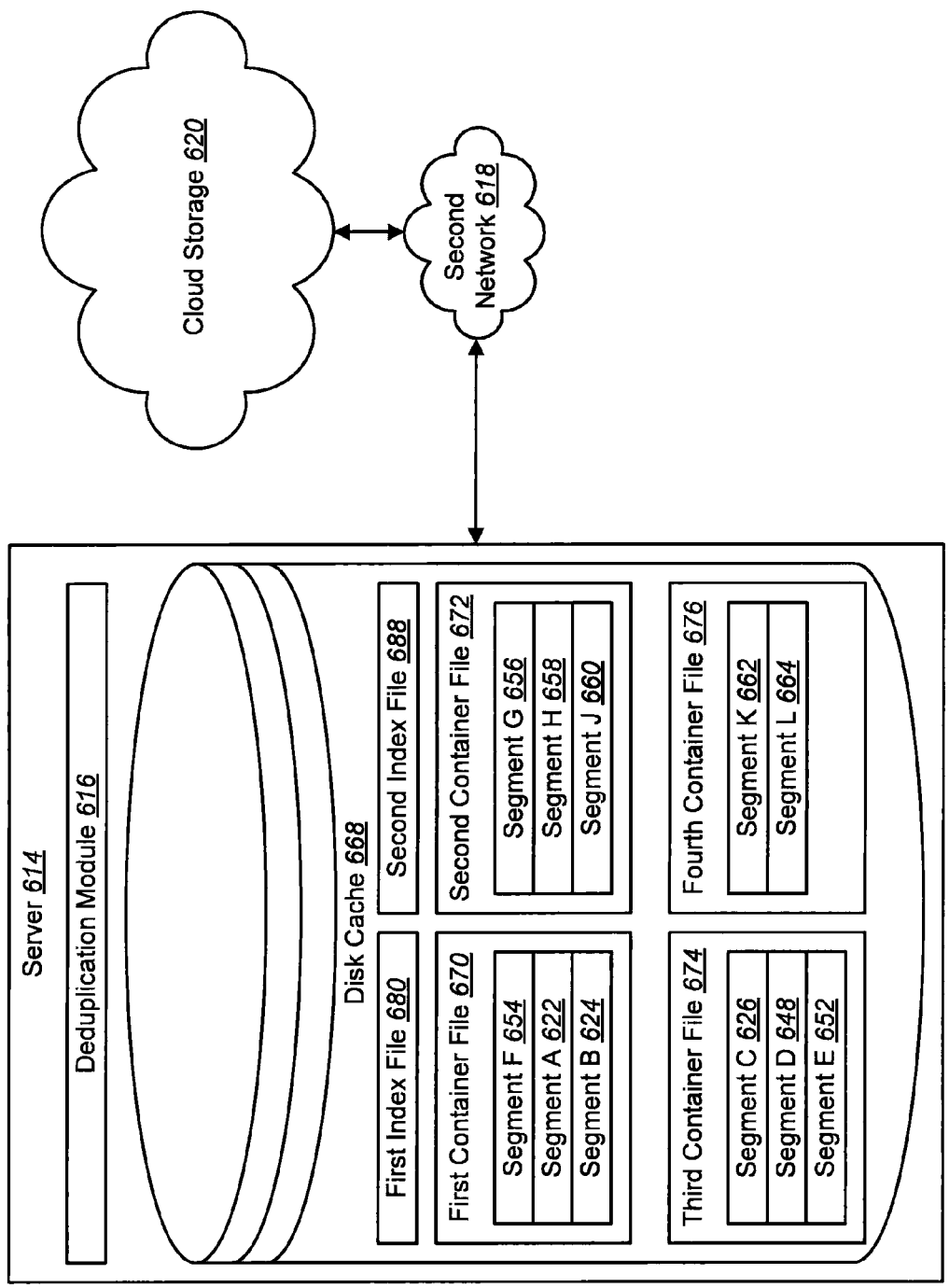
FIG. 6 is a block diagram illustrating one embodiment of a server communicating with cloud storage across a second network.

FIG. 6 is a block diagram illustrating one embodiment of a server 614 communicating with cloud storage 620 across a second network 618. The second network 618 may be a wide area network (WAN).

As previously described, the server 614 may include a deduplication module 616. The server 614 may also include a local disk cache 668. The disk cache 668 may be internal or external to the server 614. The disk cache 668 may be populated with multiple container files 670, 672, 674, 676. Each container file may store or hold various segments of data. Each segment of data in the same container file 670, 672, 674, 676 may originate from the same backup source. For example, the segments of data stored in the first container file 670 and the segments of data stored in the third container file 674 may originate from the same client device.

The disk cache 668 may also include a first index file 680 and a second index file 688. The index files 680, 688 may include information regarding the various segments of data stored in the container files. In one embodiment, each index file is associated with a specific backup source (e.g., client device). For example, the first index file 680 may include information regarding the segments of data stored within the first container 670 and the third container 674 since the segments of data stored in these two containers 670, 674 originate from the same backup source. Similarly, the second index file 688 may include information regarding the segments of data stored in the second container 672 and the fourth container 676. Each container may be stored as one container file or multiple containers may be combined into one container file on disk.

The various segments of data stored within the container files 670, 672, 674, 676 may be transmitted to cloud storage 620 across the second network 618. In addition, the index files 680, 688 may also be transmitted to cloud storage 620. In one embodiment, a copy of the first index file 680 and a copy of the second index file 688 may remain on the disk cache 668.

In another embodiment, the disk cache 668 may not retain a copy of the first index file 680 and the second index file 688.

Figure 7:
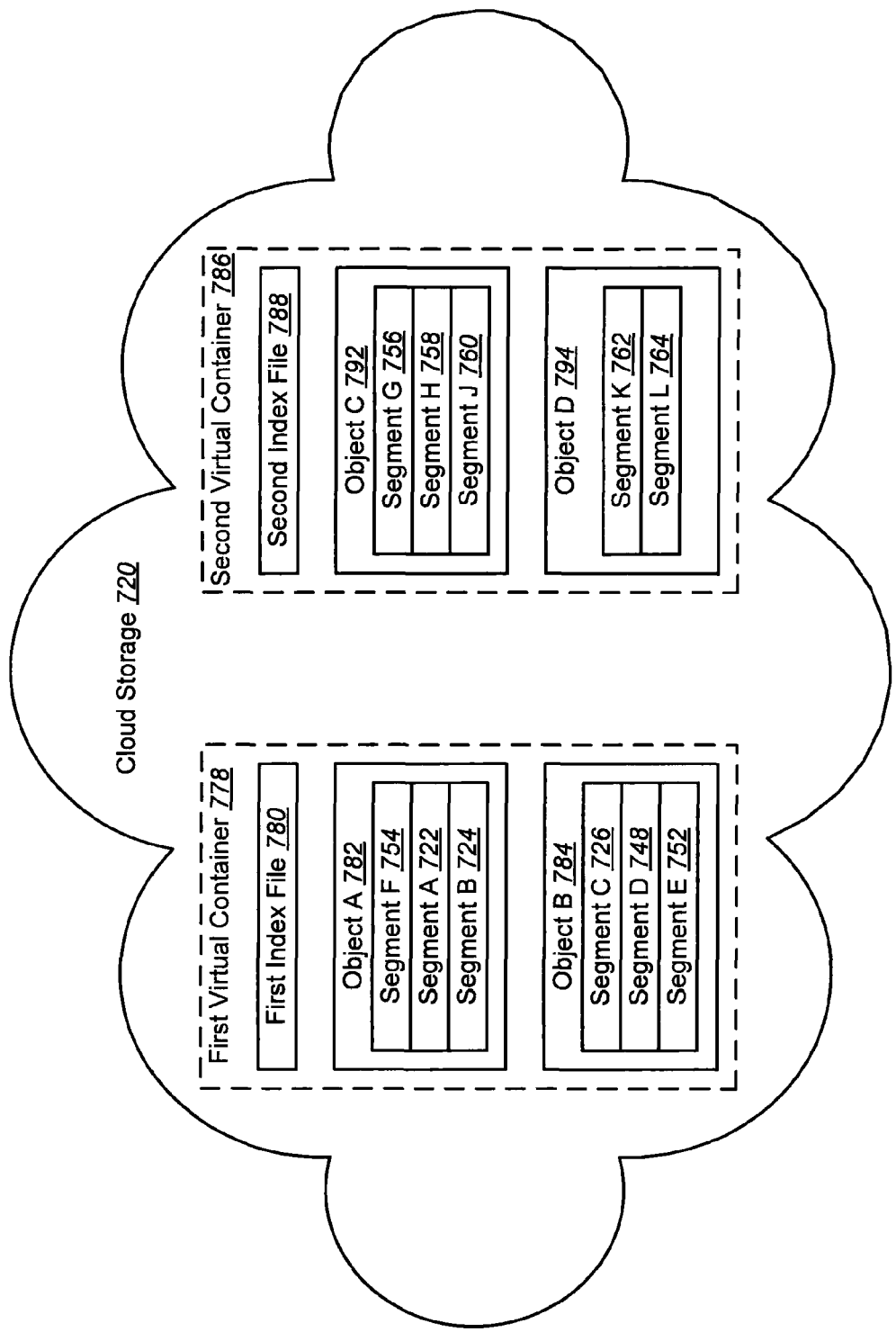
FIG. 7 is a block diagram illustrating one embodiment of cloud storage.

FIG. 7 is a block diagram illustrating one embodiment of cloud storage 720. In one configuration, the cloud storage 720 may store data received from a server 114 that implements deduplication techniques.

As previously explained, in a deduplication backup system, files from a client device may be broken into segments of data, and unique segments of data may be sent over a network connection to the server 114 to be stored on data storage. During restore operations, the segments of data may be read in from the data storage and sent to the client over the network connection in order to reconstruct the original files. During backup, many clients may concurrently send segments of data to the server 114. In order to achieve a high speed restore operation, segments of data from each individual client may be stored in a separate set of container files in order to keep data backup locality.

In one embodiment, to facilitate the server 114 to interface with cloud storage 720, virtual containers 778, 786 may be used to store the various segments of data received from clients. The virtual containers 778, 786 may include an index file 780, 788 together with segments of data stored as objects 782, 784, 792, 794 under a directory identified by the name of the virtual containers 778, 786. The directory may be a virtual concept and the actual implementation in cloud storage 720 may be provider dependent.

In the virtual containers 778, 786, the index files 780, 788 (stored as one object), may include metadata records for each segment of data. The metadata records may be ordered based on the creation time of each segment of data. Each data object 782, 784, 792, 794 may include multiple unique data segments coming from the same backup source (e.g., the first client computing device 402 and the second client computing device 450). The purpose of storing multiple segments of data into one object is to reduce the possibility of overloading cloud storage 720 with too many small segments of data and help achieve efficient object management, retrievals, and network transmission.

Figure 8:
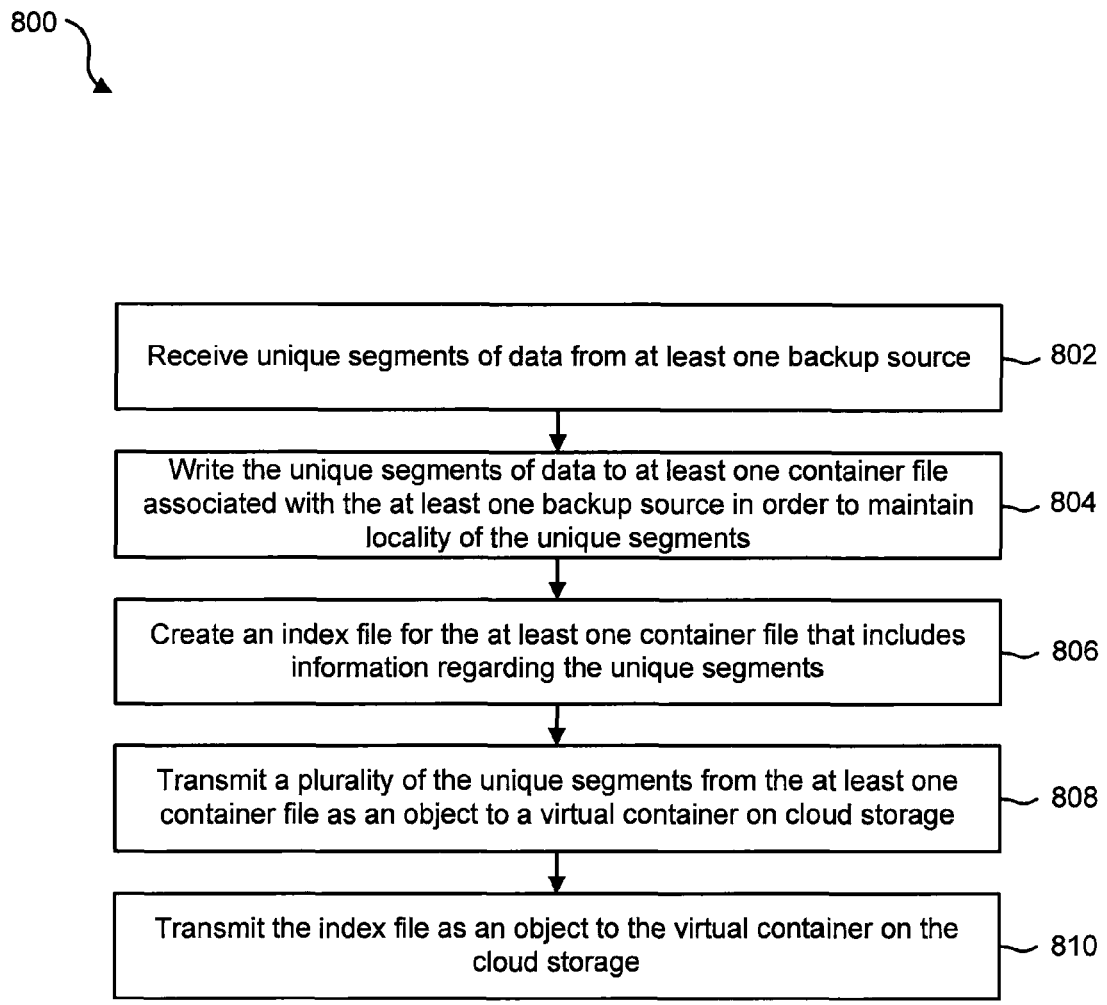
FIG. 8 is a flow diagram illustrating one embodiment of a method for backing up data using cloud storage to store the data.

FIG. 8 is a flow diagram illustrating one embodiment of a method 800 for backing up data using cloud storage to store the data. In one configuration, the method 800 may be implemented by the deduplication module 116. In one example, unique segments of data may be received 802 from at least one backup source. The unique segments of data may be written 804 to at least one container file associated with the at least one backup source in order to maintain spatial locality of the unique segments of data. An index file may be created 806 for the at least one container file that includes information regarding the unique segments of data. A plurality of the unique segments of data may be transmitted 808 from the at least one container file as an object to a virtual container on cloud storage. The index file may be transmitted 810 as an object to the virtual container on cloud storage.

In one embodiment, during backup, unique segments from the same backup client may be written into local storage media (e.g., disk cache). A set of container files may be opened to hold the incoming segments of data from each client in order to maintain the locality of the segments of data. While the backup is occurring, multiple segments of data stored within a container file may be transmitted 808 as one object to cloud storage through a web service interface, such as, but not limited to, PUT.

A fingerprint (e.g., hash value) of the binary concatenation of the data segment fingerprint contained by the object may be used as the access key to the data object stored in cloud storage. All segments of data originating from the same local file may be stored within a unique virtual container. The transmission of segments of data may continue until all segments are sent to cloud storage.

As previously explained, each container file may be associated with an index file that is created to record the segment information. The segment information may include segment fingerprints (e.g., hash value of the data segment), data storage object containing the segment, offset within the object, segment size, etc. Once the segment transmission from a container file is completed, the container file may be removed from the local storage media, and a PUT operation may upload the corresponding index file as one object to the same directory with the unique container name as its key. The local index file may be kept to facilitate future container access. The data transmissions may be completed through a separate process or thread.

Figure 9:
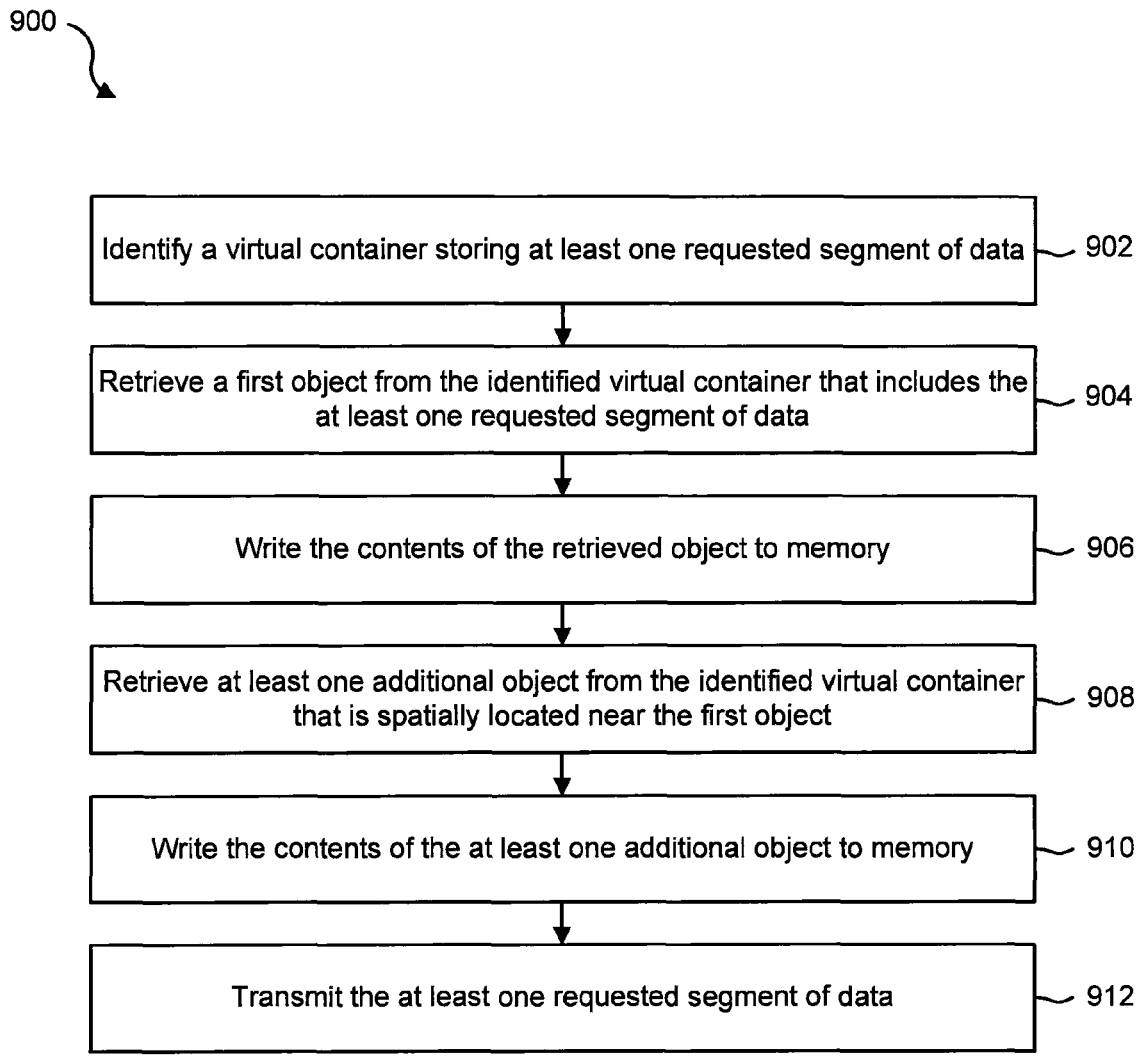
FIG. 9 is a flow diagram illustrating one embodiment of a method for restoring data to an original backup source.

FIG. 9 is a flow diagram illustrating one embodiment of a method 900 for restoring data to an original backup source. The method 900 may be implemented by the deduplication module 116.

In one embodiment, a virtual container storing at least one requested segment of data may be identified 902. The virtual container may be stored on cloud storage. A first object from the identified virtual container may be retrieved 904 that includes the at least one requested segment of data. The contents of the retrieved object may be written 906 to local memory. At least one additional object from the identified virtual container that is spatially located near the first object may also be retrieved 908. The contents of the at least one additional object may also be written 910 to local memory. In one embodiment, the at least one requested segment of data may be transmitted 912 to the original backup source for reconstruction. Fetching objects from cloud storage to local memory and transmitting segments from local memory to the client requesting backup restore may happen concurrently.

During the restore operation 900, with the first given fingerprint in a central index built from all stored segment fingerprints together with index file information, the virtual container storing the segment may be identified 902. The cloud storage object containing the requested segment of data may be retrieved 904 from the virtual container to local memory to serve the segment request. The object may include multiple segments of data with spatial locality. Objects next to each other in the virtual container may also have spatial locality from backup. As a result, multiple objects following the requested object in the virtual container may be prefetched and cached to the local memory. The next segment request may be looked up among the previously cached segments of data. For a cache hit, the read may be served from the cached segment of data. In one embodiment, once the cache with a preset size is full, first in first out (FIFO) replacement policy may be used to remove the very earliest accessed segment of data in the cache. Alternatively, segments may be saved to disk in its original container format.

Figure 10:
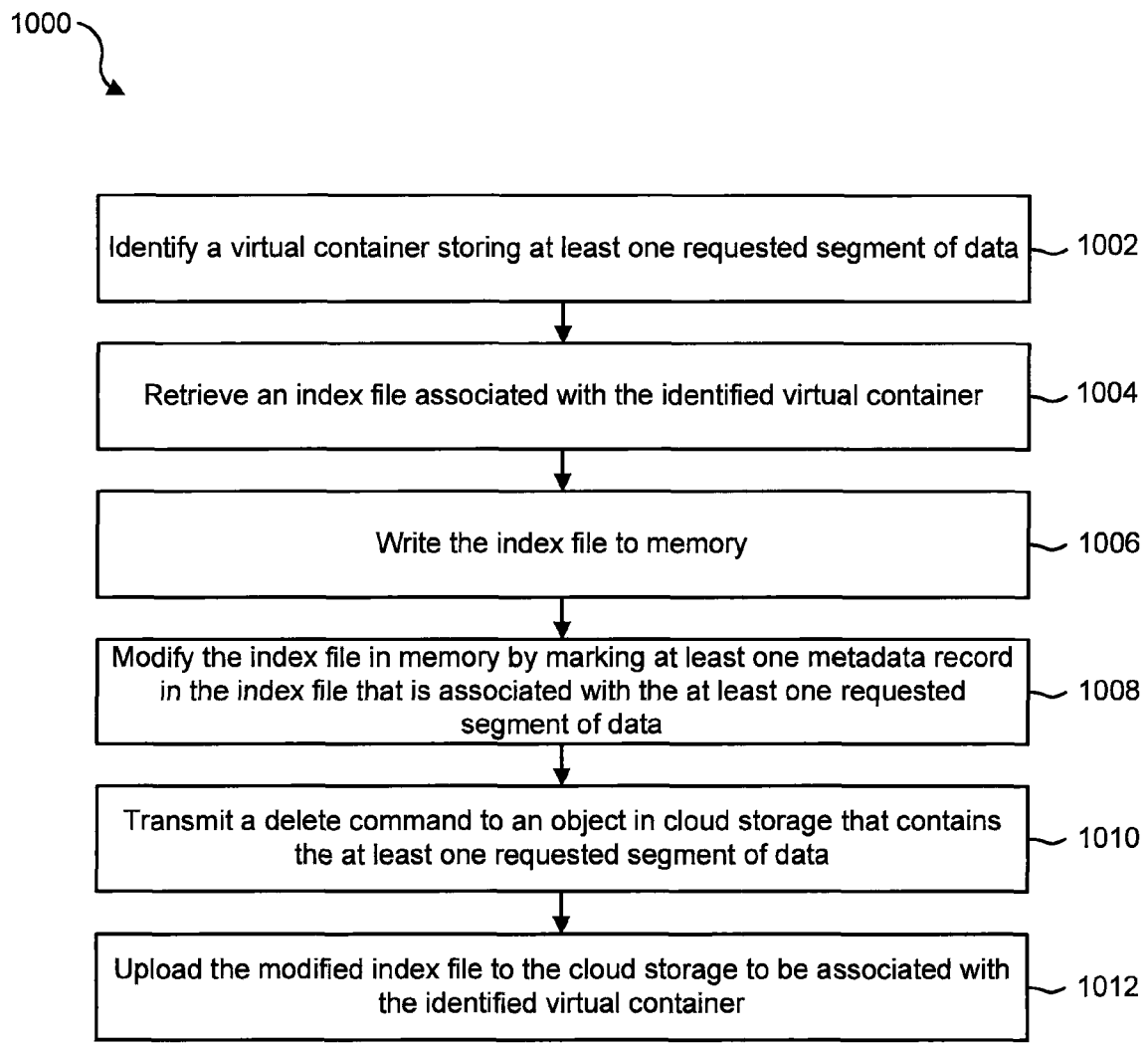
FIG. 10 is a flow diagram illustrating one embodiment of a method to remove segments of data stored in cloud storage.

FIG. 10 is a flow diagram illustrating one embodiment of a method 1000 to remove segments of data stored in cloud storage. The method 1000 may be implemented by the deduplication module 116.

In one embodiment, a virtual container storing at least one requested segment of data may be identified 1002. An index file associated with the identified virtual container may be retrieved 1004 from the identified virtual container. In one embodiment, the index file may be written 1006 to local memory. The index file in local memory may be modified 1008 by marking at least one metadata record in the index file that is associated with the at least one requested segment of data. Once records in the index file indicate that segments in a cloud storage object are all marked as deleted, a delete command may be transmitted 1010 to cloud storage to remove the object and the corresponding deleted records in the index files are removed. In one configuration, the modified index file may be uploaded 1012 from the local memory to cloud storage. The modified index file may replace the index file previously associated with the identified virtual container.

During the data removal process 1000, with the first given fingerprint in a central index built from all stored segment fingerprints together with index file information, the virtual container containing the segment to be removed may be identified 1002. The container index file may be retrieved 1004 from the virtual container in cloud storage to local memory. The metadata record associated with the segment to be deleted may be marked as deleted. If all segments contained by one cloud storage object are marked as deleted, a web service interface DELETE may be transmitted 1010 to cloud storage in order to remove the corresponding object. The corresponding metadata records are removed from the index file. At the end of the data removal operation 1000, the index file involved with data removal may be uploaded 1012 back to the virtual container in order to update the virtual container on cloud storage. Since segments contained by the same cloud storage object have spatial locality, the segments stored in the same cloud storage object may have a high probability of being removed together from cloud storage or kept together.

As provided above, the present systems and methods, through the implementation of virtual containers and segment cache, data transmission in and out of cloud storage may be minimized. In addition, only unique segments may be stored on cloud storage.

Figure 11:
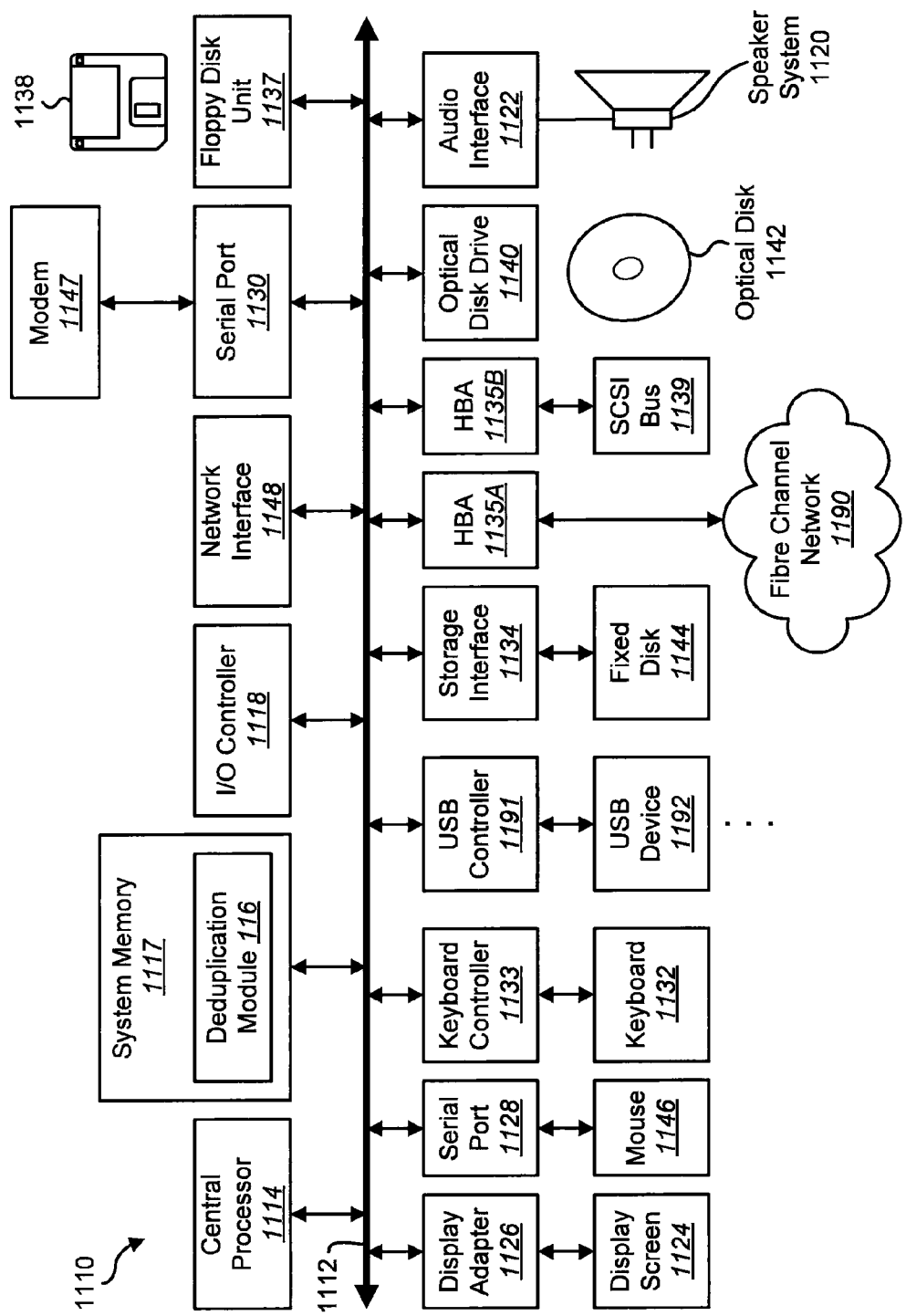
FIG. 11 depicts a block diagram of a computer system suitable for implementing the present systems and methods.

FIG. 11 depicts a block diagram of a computer system 1110 suitable for implementing the present systems and methods. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), multiple USB devices 1192 (interfaced with a USB controller 1190), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the deduplication module 116 to implement the present systems and methods may be stored within the system memory 1117. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 848 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present systems and methods. The devices and subsystems can be interconnected in different ways from that shown in FIG. 11. The operation of a computer system such as that shown in FIG. 11 is readily known in the art and is not discussed in detail in this application. Code to implement the present disclosure can be stored in computer-readable medium such as one or more of system memory 1117, fixed disk 1144, optical disk 1142, or floppy disk 1138. The operating system provided on computer system 1110 may be MS-DOS", MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
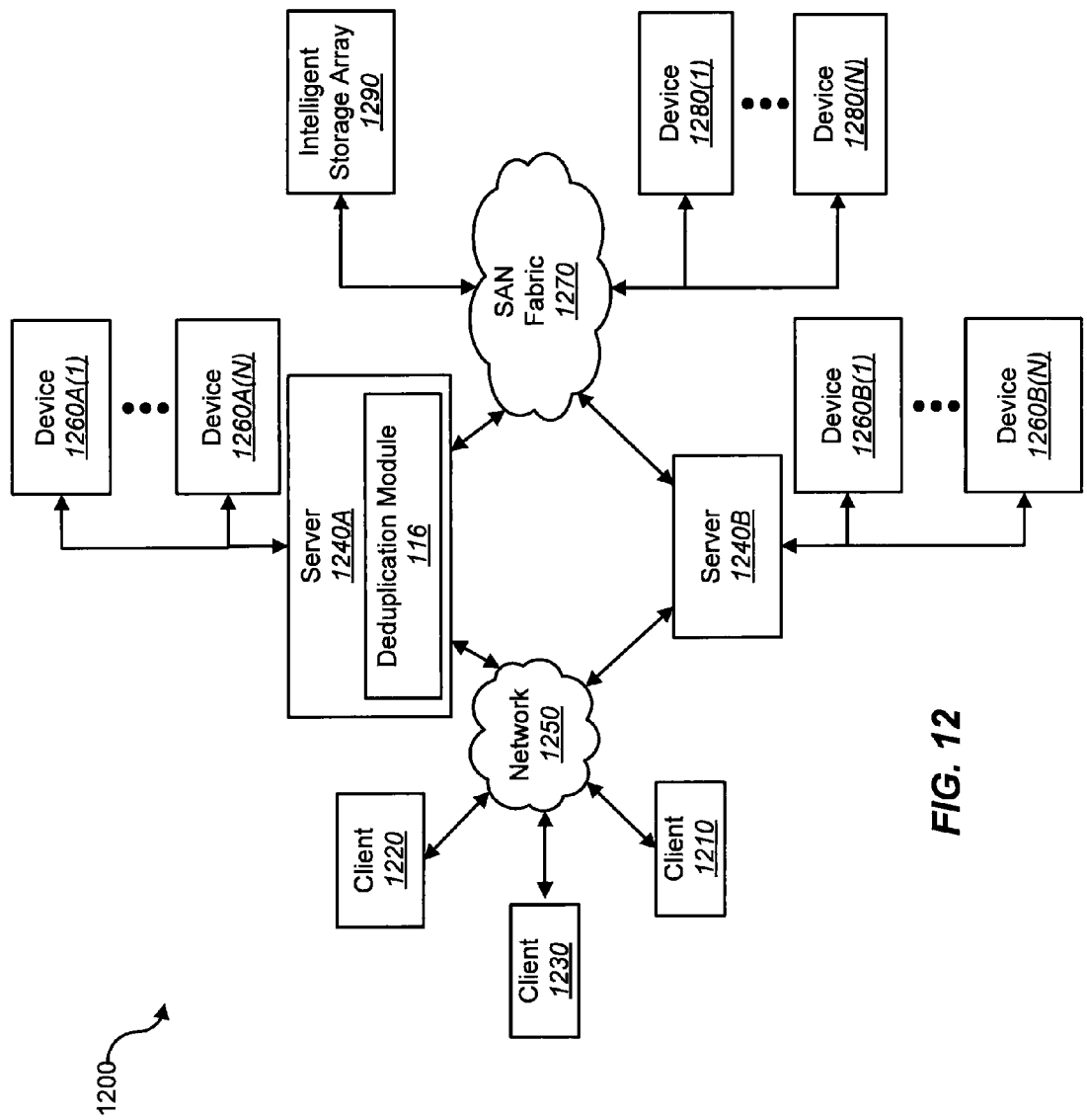
FIG. 12 is a block diagram depicting a network architecture in which client systems, as well as storage servers (any of which can be implemented using computer system), are coupled to a network.

FIG. 12 is a block diagram depicting a network architecture 1200 in which client systems 1210, 1220 and 1230, as well as storage servers 1240A and 1240B (any of which can be implemented using computer system 1210), are coupled to a network 1250. In one embodiment, the deduplication module 116 may be located within a server 1240A, 1240B to implement the present systems and methods. The storage server 1240A is further depicted as having storage devices 1260A(1)-(N) directly attached, and storage server 1240B is depicted with storage devices 1260B(1)-(N) directly attached. SAN fabric 1270 supports access to storage devices 1280(1)-(N) by storage servers 1240A and 1240B, and so by client systems 1210, 1220 and 1230 via network 1250. Intelligent storage array 1290 is also shown as an example of a specific storage device accessible via SAN fabric 1270.

With reference to computer system 1110, modem 1147, network interface 1148 or some other method can be used to provide connectivity from each of client computer systems 1210, 1220, and 1230 to network 1250. Client systems 1210, 1220, and 1230 are able to access information on storage server 1240A or 1240B using, for example, a web browser or other client software (not shown). Such a client allows client systems 1210, 1220, and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing data in cloud storage using deduplication techniques, comprising:
   receiving, by a server from a client, a file divided, by the client, into a plurality of segments of data;
   identifying unique segments of data and one or more groups of identical segments of data among the plurality of segments of data;
   writing, by a processor, a portion of the plurality of segments of data to at least one container file, the at least one container file being associated with a single client, wherein the portion of the plurality of segments of data comprises each unique segment of data and one segment from each group of identical segments of data;
   creating, by the processor, an index file for the at least one container file, wherein the index file comprises an association with client, and information regarding the portion of the plurality of segments of data written to the at least one container file; and
   transmitting an object from the server to a virtual container on cloud storage, the object comprising the at least one container file, wherein a segment of the unique segments of data is maintained in the object in the same spatial locality as any other segments of the unique segments of data from the same backup source.

2. The method of claim 1, further comprising transmitting the index file as an object to the virtual container on cloud storage, wherein the index file object combined with the at least one container file comprises the virtual container.

3. The method of claim 1, wherein a spatial locality of the portion of the plurality of segments of data written to the at least one container file is maintained in the at least one container file.

4. The method of claim 1, further comprising identifying a virtual container storing at least one requested segment of data on cloud storage.

5. The method of claim 4, further comprising retrieving a first object from the identified virtual container that includes the at least one requested segment of data.

6. The method of claim 5, further comprising writing the contents of the first object to local memory.

7. The method of claim 6, further comprising retrieving at least one additional object from the identified virtual container on cloud storage, wherein the at least one additional object is spatially located near the first object.

8. The method of claim 4, further comprising retrieving a first index file associated with the identified virtual container on cloud storage.

9. The method of claim 8, further comprising writing the first index file to local memory.

10. The method of claim 9, further comprising modifying the first index file in local memory by marking at least one metadata records in the first index file that is associated with the at least one requested segment of data on cloud storage.

11. The method of claim 10, further comprising transmitting a removal command to an object in cloud storage that comprises the at least one requested segment of data once all segments contained in a cloud storage object are marked as deleted.

12. The method of claim 11, further comprising uploading the modified first index file to cloud storage to replace the first index file.

13. A computing device configured to manage data in cloud storage using deduplication techniques, comprising:
   a processor;
   memory in electronic communication with the processor;
   a deduplication module configured to:
      receive, by a server from a client, a file divided, by the client, into a plurality of segments of data;
      write a portion of the plurality of segments of data to at least one container file, the at least one container file being associated with a single client, wherein the portion of the plurality of segments of data comprises each unique segment of data and one segment from each group of identical segments of data;
      create an index file for the at least one container file, wherein the index file comprises an association with the client, and information regarding the portion of the plurality of segments of data written to the at least one container file; and
      transmit an object from the server to a virtual container on cloud storage, the object comprising the at least one container file, wherein a segment of the unique segments of data is maintained in the object in the same spatial locality as any other segments of the unique segments of data from the same backup source.

14. The computing device of claim 13, wherein the deduplication module is further configured to transmit the index file as an object to the virtual container on cloud storage, wherein the index file object combined with the at least one container file comprises the virtual container.

15. The computing device of claim 13, wherein a spatial locality of the portion of the plurality of segments of data written to the at least one container file is maintained in the at least one container file.

16. The computing device of claim 13, wherein the deduplication module is further configured to identify a virtual container storing at least one requested segment of data on cloud storage.

17. The computing device of claim 16, wherein the deduplication module is further configured to retrieve a first object from the identified virtual container that includes the at least one requested segment of data.

18. The computing device of claim 17, wherein the deduplication module is further configured to write the contents of the first object to local memory.

19. The computing device of claim 18, wherein the deduplication module is further configured to retrieve at least one additional object from the identified virtual container on cloud storage, wherein the at least one additional object is spatially located near the first object.

20. A computer-program product for managing data in cloud storage using deduplication techniques, the computer-program product comprising a non-transitory computer-readable medium having instructions thereon, the instructions comprising:
   code programmed to receive, by a server from a client, a file divided, by the client, into a plurality of segments of data;
   code programmed to write a portion of the plurality of segments of data to at least one container file, the at least one container file being associated with a single client, wherein the portion of the plurality of segments of data comprises each unique segment of data and one segment from each group of identical segments of data;

code programmed to create an index file for the at least one container file, wherein the index file comprises an association with the client, and information regarding the portion of the plurality of segments of data written to the at least one container file; and code programmed to transmit an object from the server to a virtual container on cloud storage, the object comprising the at least one container file, wherein a segment of the unique segments of data is maintained in the object in the same spatial locality as any other segments of the unique segments of data from the same backup source.

* * * * *